(12) United States Patent
Pellini

(10) Patent No.: US 10,539,104 B2
(45) Date of Patent: Jan. 21, 2020

(54) THREE STAGE PROPORTIONAL CONTROL VALVE

(71) Applicant: Stanadyne LLC, Windsor, CT (US)

(72) Inventor: Richard Paulo Pellini, South Windsor, CT (US)

(73) Assignee: Stanadyne LLC, Windsor, CT (US)

(*) Notice: Subject to any disclaimer, the term of this patent is extended or adjusted under 35 U.S.C. 154(b) by 302 days.

(21) Appl. No.: 15/709,758

(22) Filed: Sep. 20, 2017

(65) Prior Publication Data

US 2019/0085805 A1  Mar. 21, 2019

(51) Int. Cl.
| | |
|---|---|
| *F02M 59/36* | (2006.01) |
| *F02M 59/46* | (2006.01) |
| *F02M 63/02* | (2006.01) |
| *F16K 31/06* | (2006.01) |
| *F04B 7/00* | (2006.01) |

(52) U.S. Cl.
CPC ........ *F02M 59/366* (2013.01); *F02M 59/466* (2013.01); *F02M 63/0265* (2013.01); *F04B 7/0076* (2013.01); *F16K 31/0613* (2013.01)

(58) Field of Classification Search
CPC ............. F02M 37/0023; F02M 59/366; F02M 59/466; F02M 63/0265
See application file for complete search history.

(56) References Cited

U.S. PATENT DOCUMENTS

| | | | | |
|---|---|---|---|---|
| 2,474,396 A | * | 6/1949 | Groves | ................... F02M 41/08 417/269 |
| 3,938,911 A | | 2/1976 | Salzgeber et al. | |
| 4,250,857 A | | 2/1981 | Taplin | |
| 4,374,511 A | | 2/1983 | Schechter | |
| 4,586,656 A | * | 5/1986 | Wich | .................... F02M 59/466 123/458 |
| 4,940,037 A | | 7/1990 | Eckert | |
| 5,558,068 A | * | 9/1996 | Kunishima | ........... F02D 33/006 123/179.17 |
| 6,135,135 A | | 10/2000 | Futa, Jr. et al. | |
| 6,253,734 B1 | * | 7/2001 | Rembold | ............ F02D 41/3845 123/446 |
| 6,446,613 B1 | * | 9/2002 | Djordjevic | ........... F02M 63/005 123/456 |

(Continued)

OTHER PUBLICATIONS

International Search Report and Written Opinion dated Oct. 10, 2018 (PCT/US2018/047461).

*Primary Examiner* — Erick R Solis
*Assistant Examiner* — Anthony L Bacon
(74) *Attorney, Agent, or Firm* — Alix, Yale & Ristas, LLP

(57) ABSTRACT

An energize-to-close solenoid operated spool type inlet control valve for a high pressure fuel pump is variably positionable relative to a sleeve having three inlet feed ports and the inlet check valve member, to implement three stages of pump operation: limp-home, low-pressure flow from the low-pressure feed pump to the common rail, no flow to the common rail, and metered quantity of flow to the common rail. The spool valve includes an axially extending internal passage fluidly connected to a fluid volume at the front end of the spool valve, and a control port at the back end of the spool valve, selectively alignable to fluidly connect the ports. Two springs of different lengths either alone or together, bias the spool valve toward opening of the inlet check valve.

16 Claims, 8 Drawing Sheets

◄──────── ENERGIZING STROKE

(56) References Cited

U.S. PATENT DOCUMENTS

| | | | |
|---|---|---|---|
| 2009/0199820 A1* | 8/2009 | Geyer | F02M 55/025 123/447 |
| 2010/0147266 A1* | 6/2010 | Crispen | F02M 59/466 123/446 |
| 2014/0116523 A1* | 5/2014 | Puckett | F02D 19/0673 137/12 |
| 2014/0216407 A1* | 8/2014 | Smith | F02D 41/22 123/446 |
| 2016/0010607 A1 | 1/2016 | Lucas | |

* cited by examiner

THREE STAGE PROPORTIONAL CONTROL VALVE

BACKGROUND

The present invention relates to a multi-stage control valve for delivering fuel to a plunger-type high pressure pump for a common rail fuel system.

A common rail fuel delivery system for automotive applications must accommodate three operating conditions: a limp-home or bypass fuel supply condition to provide low-pressure flow from the low-pressure feed pump to the common rail; a zero net flow condition to provide zero flow to the common rail; and a metering condition to provide a metered quantity of flow at high pressure to the common rail.

Commonly, fuel delivery to a common rail fuel pump is implemented by a digitally controlled valve. In this case, the valve default is open, so in the limp-home situation fuel can flow directly from the low-pressure feed circuit through the pumping chamber to the pump discharge valve and on to the common rail. The zero-fueling condition is not a design consideration since the valve is assumed to have zero-leakage for any operating condition; digitally closing the valve achieves zero leakage. Metering is controlled by digitally timing the duration of the opening and closing of the valve.

U.S. Publication No. 2016/0010607 discloses a proportional solenoid operated inlet control valve that is in a normally open condition. In order to achieve the bypass and zero flow conditions, the solenoid must be fully energized, which requires high power consumption. Also, in the bypass condition, that system provides very limited flow in the event of a power failure to solenoid 6 (because the low pressure flow must overcome the opening pressures of check valves 5 and 11). For the zero flow condition, the system of U.S. Publication No. 2016/0010607 relies on the match clearance of bores 27 and 21 and/or the strategy to selectively open valve 5 by the piston 13. Testing has shown that controllability on this condition is inadequate.

SUMMARY

The present invention relies on a different approach to control, by using a multi-stage spool valve. This has the advantage of a more explicit hardware relationship for the stages, but must take into account the fact that for cost-effective tolerances, the spool valve will leak.

According to the present disclosure, a spool type inlet control valve is variably positionable relative to three inlet feed ports and the inlet check valve member, to implement three stages of high pressure pump (HPP) operation, associated with three conditions: limp-home, low-pressure flow from the low-pressure feed pump to the common rail, no flow to the common rail, and metered quantity of flow at high pressure to the common rail.

The spool valve includes an axially extending internal passage fluidly connected to a fluid volume at the front end of the spool valve, and a control port at the back end of the spool valve, selectively alignable to fluidly connect a bypass port with the internal passage and fluid volume and selectively alignable to fluidly connect a metering port with the internal passage and fluid volume, while the fluid volume always remains in fluid communication with a drain port and the inlet valve seat such that fluid flowing through the opening of the inlet valve seat also flows through said fluid volume. A proportional actuator, such as a proportional solenoid magnetically coupled to the back end of the spool valve, provides selective variable displacement of the spool valve, whereby combinations of forces applied by springs and the solenoid selectively position the spool valve to uncover and cover the bypass port and the metering port and open or close the inlet check valve member against the inlet valve.

With the present invention, the overall power consumption for feed fuel delivery is proportional to the amount of required fuel flow, whereas power consumption for the system disclosed in U.S. Publication No. 2016/0010607 is inversely proportional. Accordingly, the present invention imposes a lower parasitic load on the engine and decreases specific fuel consumption.

DETAILED DESCRIPTION

Figure 1:
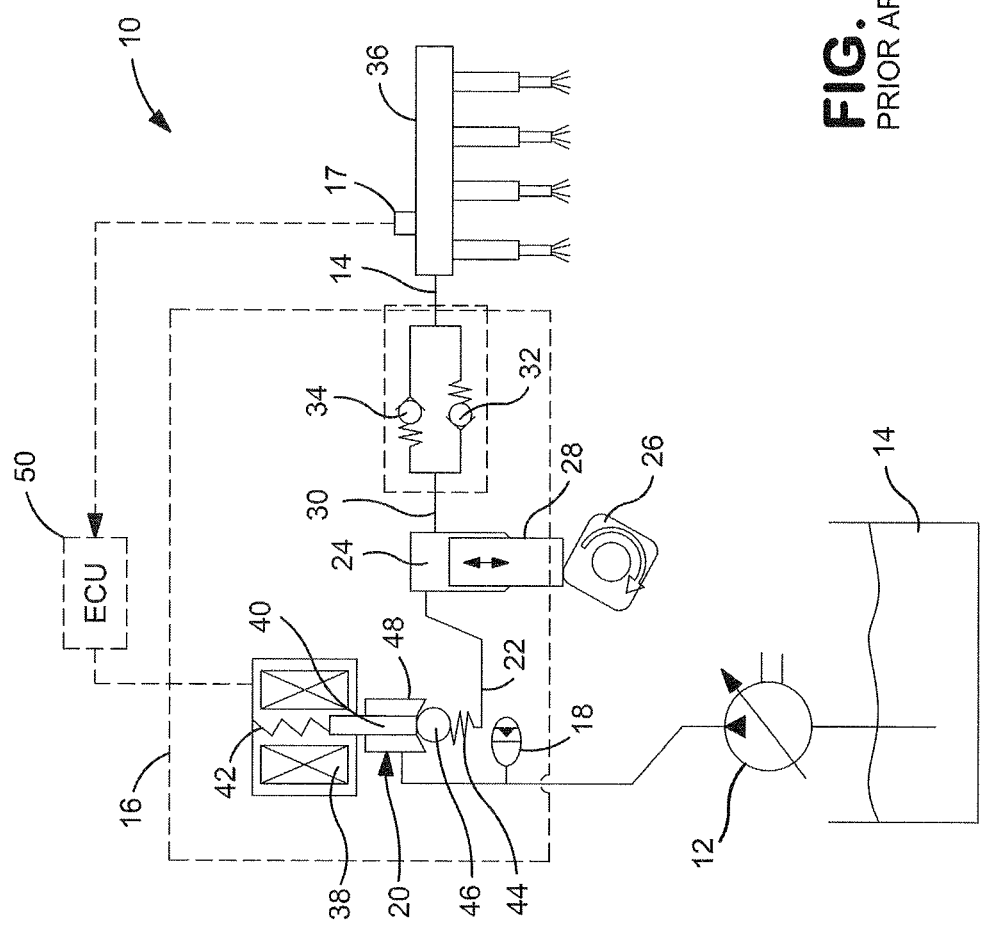
FIG. 1 shows an overview of a fuel delivery system into which an inlet control valve according to the present invention can be implemented.

According to FIG. 1, a fuel delivery system 10 includes low-pressure feed pump 12 that pressurizes fuel from a fuel tank 14, and delivers it at a relatively low feed pressure to a high pressure pump 16. The fuel then passes under the influence of an accumulator 18 to an inlet control valve 20. The control valve 20 delivers fuel at the feed pressure through an inlet passage 22 to a pumping chamber 24, where engine camshaft 26 reciprocally drives a pumping piston or plunger 28 in an upward, pumping stroke and a downward charging stroke. An outlet passage 30 extends from the pumping chamber to a discharge valve 32 and associated overpressure relief valve 34, for delivering high pressure fuel to the common rail 36 that feeds the engine fuel injectors.

The control valve 20 determines the quantity of fuel that is delivered to the common rail. A proportional solenoid actuator 38 magnetically coupled to the control valve, variably displaces the control valve member 40, whereby the combination of magnetic force and opposing spring or springs 42, 44 selectively positions the control valve member 40 to open or close the inlet check valve 46 against the inlet valve seat formed on sleeve 48.

Desired rail pressure is controlled by a closed feedback loop in the Electronic Control Unit (ECU) 50. This is accomplished by coordinating the action of the control valve 20 and the motion of the pumping piston 28, such that the control valve 20 closes when the pumping piston 28 is driven in an upward motion by the engine camshaft 26.

FIGS. 2-8 disclose an improved, spool-type inlet control valve 100 that is suited to implement three stages of high pressure pump (HPP) operation: low-pressure flow from the low-pressure feed pump to the common rail; zero flow to the common rail; and metered quantity of flow at high pressure to the common rail.

Figure 2:
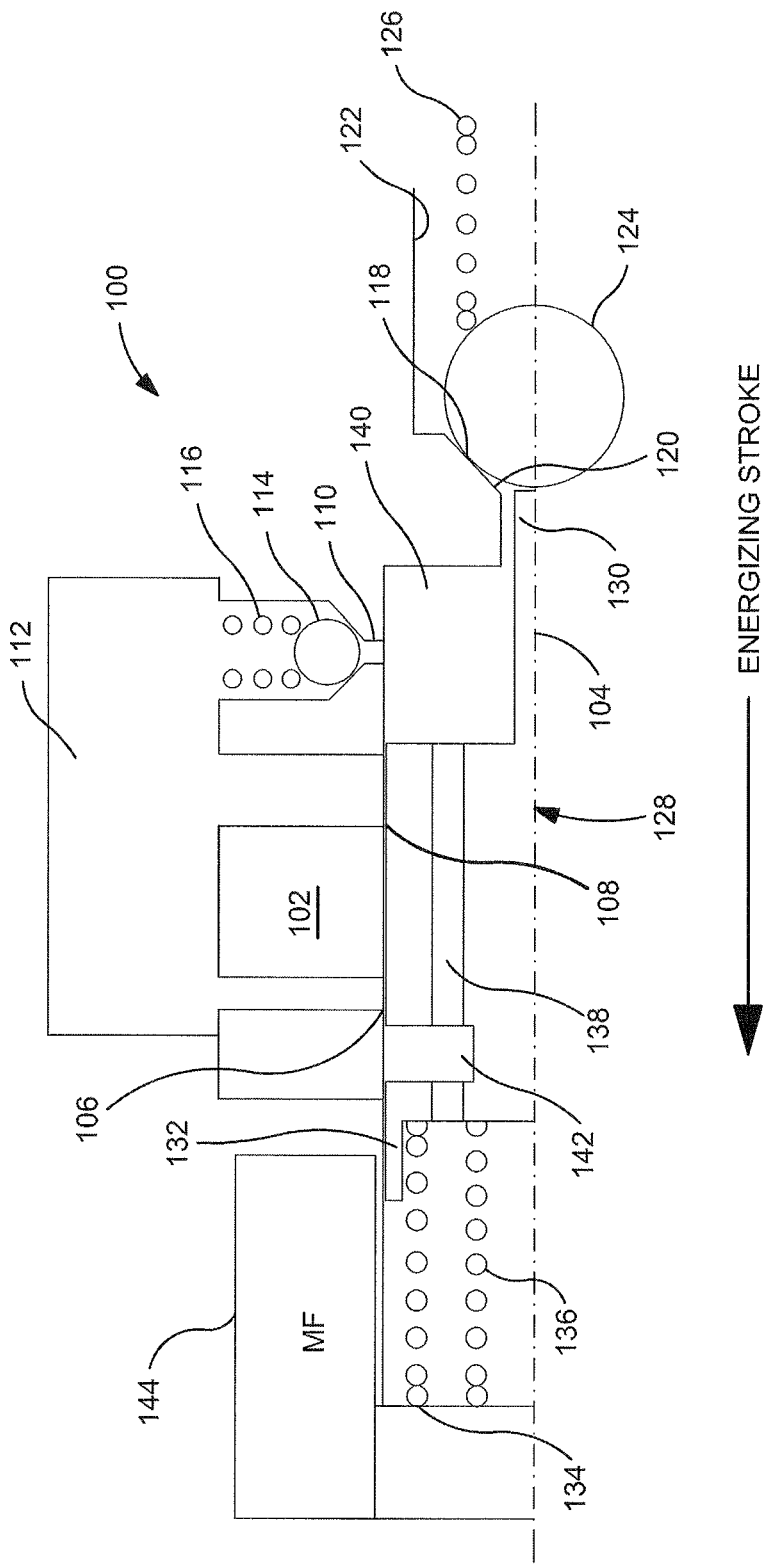
FIG. 2 shows the overall configuration of an embodiment of the inventive control valve.
Figure 3:
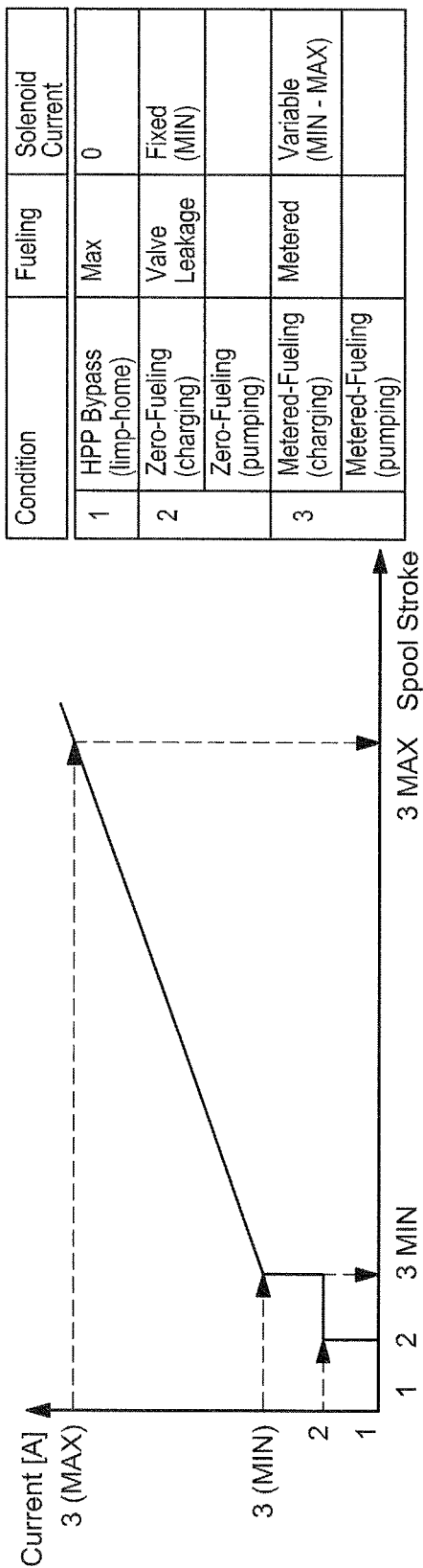
FIG. 3 graphically shows the relationship between solenoid current and displacement or stroke of the spool valve of the control valve depicted in FIG. 2.
Figure 4:
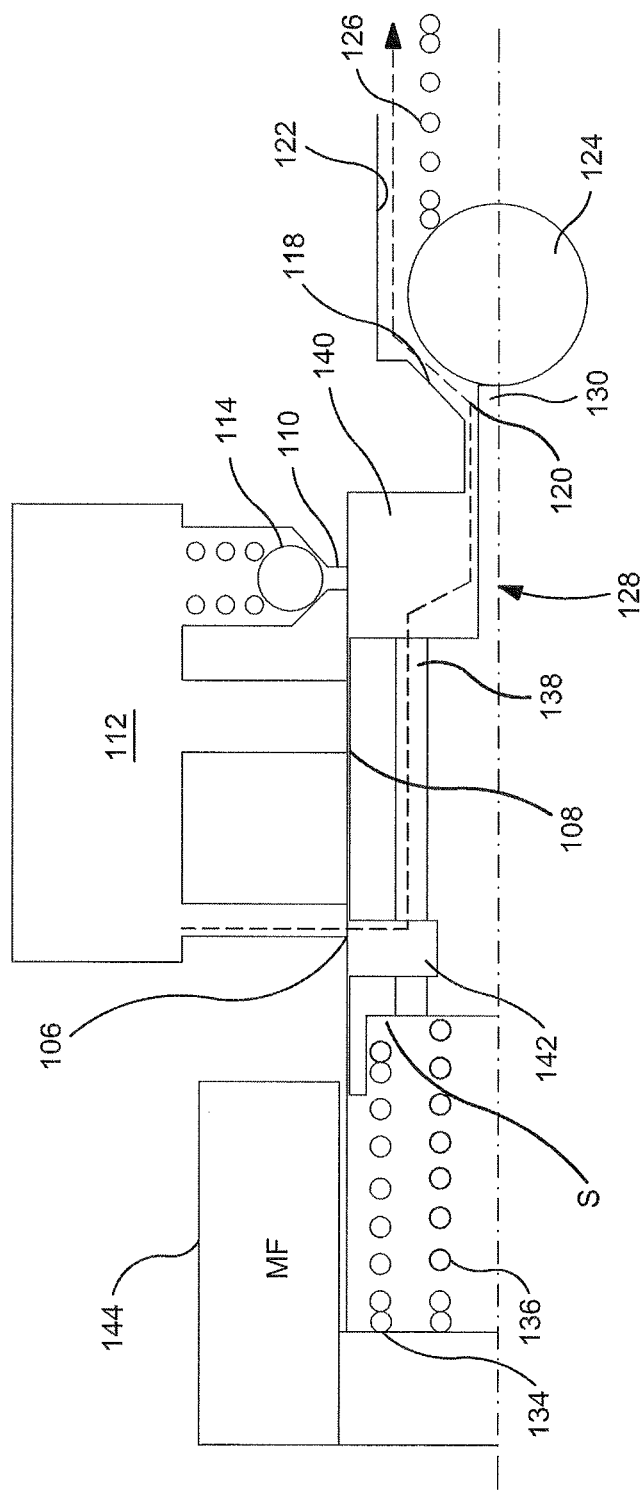
FIG. 4 shows the position of the spool valve for the first stage, of pump bypass.
Figure 5:
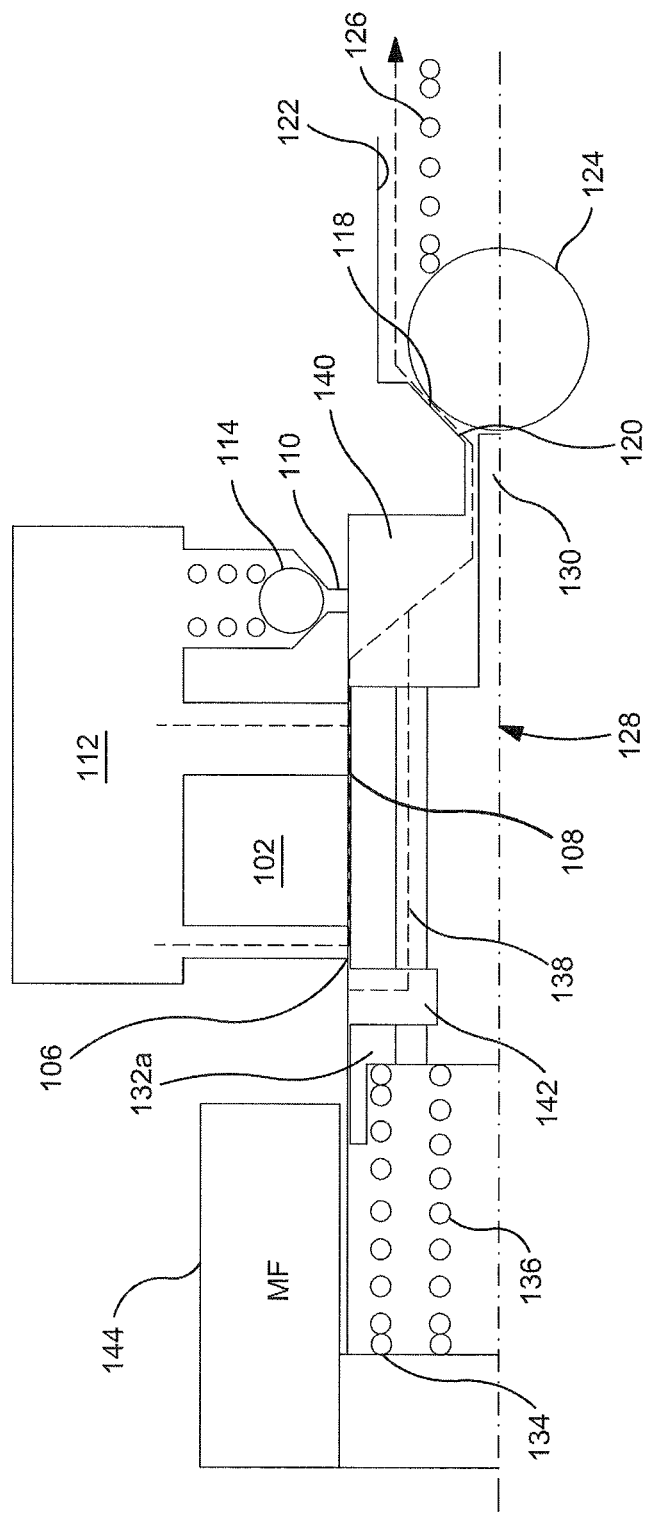
FIGS. 5 and 6 show the second stage, zero fueling position of the spool valve during charging and pumping phases of the pump.
Figure 6:
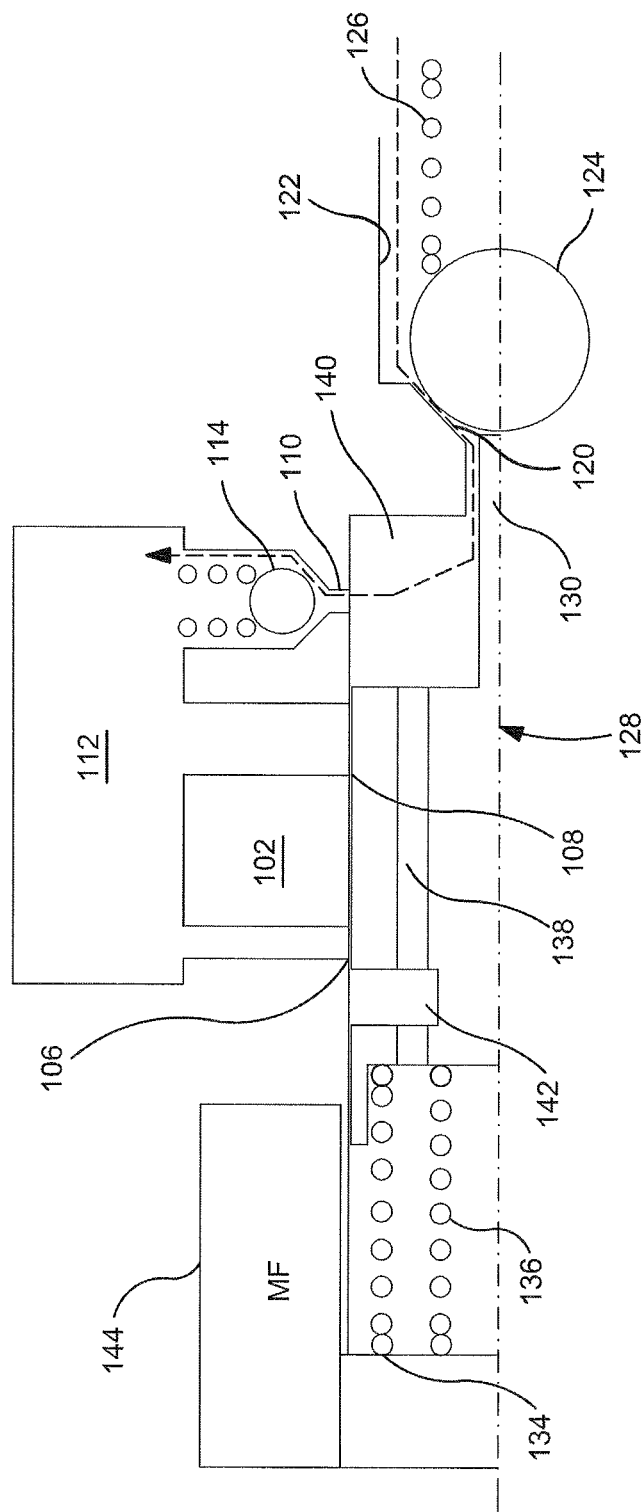
Figure 7:
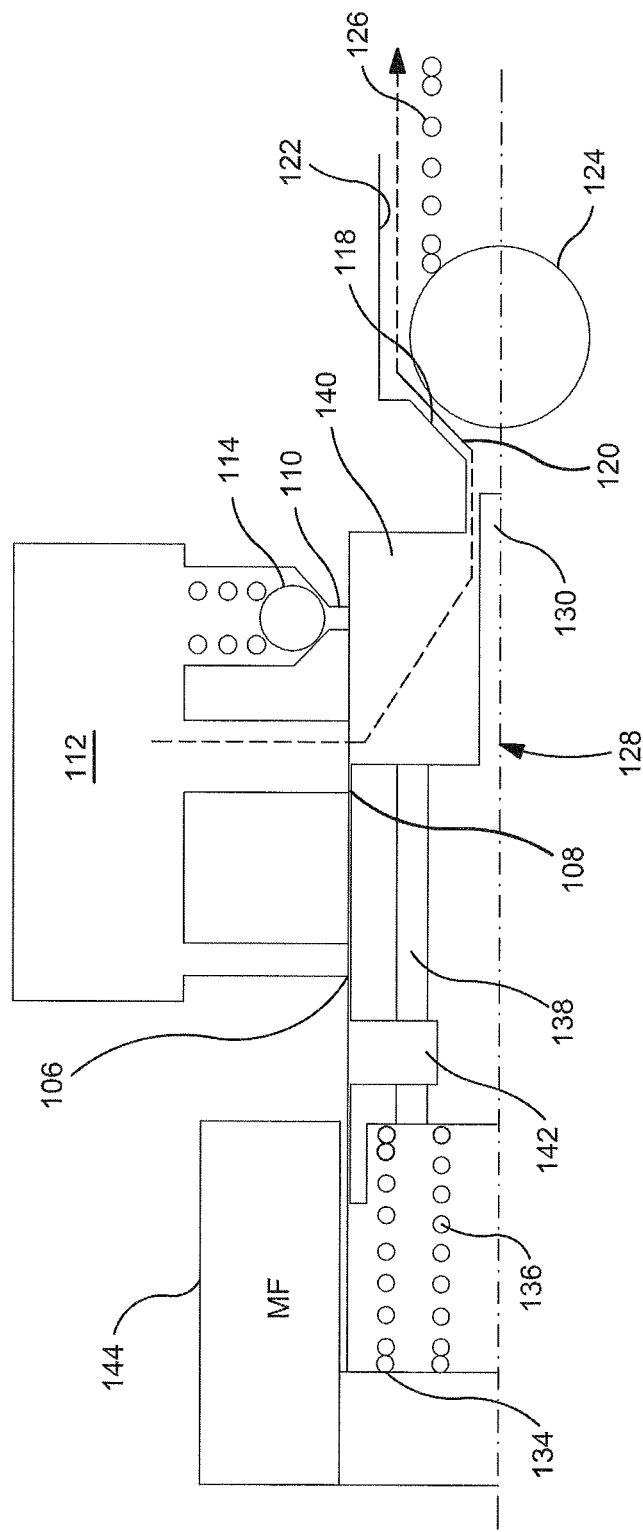
FIGS. 7 and 8 show the third stage, inlet metering position of the spool valve during the charging and pumping phases of the pump.

FIG. 2 shows the overall configuration of the control valve, and FIG. 3 graphically shows the relationship between solenoid current and displacement or stroke of the spool control valve. FIG. 4 shows the position of the spool valve for Stage 1 (HPP bypass stage), FIGS. 4 and 5 show the position of the spool valve for Stage 2 (zero fueling stage) and FIGS. 6 and 7 show the position of the spool valve for Stage 3 (inlet metering stage). The operations will be described with reference to the pumping and charging phases described above with respect to FIG. 1.

According to FIG. 2, a cylindrical valve sleeve 102 defines a valve axis 104 and has a bypass port 106 at a back end of the sleeve, axially spaced from an intermediate metering port 108, which is axially spaced from a drain port 110 at a front end of the sleeve, with all the ports subject to feed fuel in an inlet plenum 112. The drain port 110 is subject to opening and closing of a leakage check valve 114 biased with spring 116 applying a closing force. The inlet valve seat 118 is situated at the front end of the sleeve and defines a flow opening 120 into the inlet passage 122 to the pumping chamber. An inlet check valve member 124 with associated spring 126 is adapted to urge the check valve member with a closing force against the seat, preferably equal to the closing force on the leakage check valve 114.

A spool valve 128 is situated for axial displacement within the sleeve 102, having a front end 130 confronting the inlet check valve member 124 and a back end 132 subject to biasing forces of a metering spring 134 and a bypass spring 136, axially toward the inlet check valve member 124. The spool valve includes an outer surface, an axially extending internal passage 138 fluidly connected to a fluid volume 140 at the front end of the spool valve, and a control port 142 through the outer surface at the back end of the spool valve. In response to the current applied to the solenoid 144 acting on the spool valve portion 132, the control port 142 is selectively alignable within the sleeve 102 to fluidly connect the bypass port 106 with the passage 138 and the fluid volume 140 and selectively alignable to fluidly connect the metering port 108 with the internal passage 138 and fluid volume 140. The fluid volume 140 always remains in fluid communication with drain port 110 and the inlet valve seat 118 such that fluid flowing in either direction through the opening 120 of the inlet valve seat also flows through the fluid volume 140.

FIG. 3 shows the step-changes and range of energizing current with the resulting stroke of the spool valve, for the three stages.

Stage 1 (FIG. 4)

For the HPP bypass condition, it is assumed that the pumping plunger reciprocates but the pump is functionally inoperable. The combination of spring forces and solenoid actuation displaces the spool valve 128 to a first position in which the control port 142 aligns with the bypass port 106, the spool valve outer surface covers the metering port 108, the inlet check valve member 124 is open, and the leakage check valve 114 is closed.

The valve current is set to zero, i.e., solenoid 144 is inactive. The force of spring 136 is greater than that of spring 126 and it moves the spool valve 128, exposing port 106, at the same time opening inlet check valve 124. Inlet flow through port 106 travels through the passage 138 and through opening 120 and inlet passage 122 into the pumping chamber. The inlet pressure at plenum 112 is greater than the opening pressure of the outlet check valve 32 (FIG. 1), so the rail is pressurized regardless of the pump operation. Even if the pumping plunger is still operational, pumping is disabled because the inlet valve member 124 remains open.

Stage 2 (FIGS. 5 and 6)

In the zero fueling stage, the combination of spring forces and solenoid actuation displaces the spool valve 128 to a second position in which the spool valve outer surface covers the bypass port 106 and the metering port 108, the inlet check valve member 124 is cracked open off seat 118, and the leakage check valve 114 is closed during the charging phase and open during the pumping phase. During the zero-fueling condition, the pump is assumed operable, but no fuel is transferred to the rail.

During the charging phase, the current is set to a fixed condition, lower than the maximum available current; i.e., solenoid 144 is partially energized. The magnetic force MF is greater than the force of spring 136; spool 128 moves until it contacts spring 134. The force balance is such that MF balances the forces of spring 136+spring 134+spring 126, and the front 130 of the spool valve keeps the valve member 124 open. Because of the radial clearances between the outer surface of spool valve 128 and the bore of sleeve 102, the spool valve has an intrinsic leakage. During the charging phase, any leakage through the valve will reach the pumping chamber through inlet passage 122.

During the pumping phase, any volume accumulated in the pumping chamber will flow through seat 118 with valve 124 open. Because the spool valve 128 is pressure balanced, the valve will not move and both ports 106 and 108 will remain closed. If the pumping pressure is greater than the opening pressure of valve 114, valve 114 will open and fuel will flow into the plenum 112 at feed pressure. The setting pressure of valve 114 is lower than the minimum desired pressure of the rail. Preferably, the leakage check valve 114 and associated leakage valve spring 116 bias the drain port 110 closed with a spring force equal to the spring force applied by the inlet check valve spring 126 against the inlet check valve member 124.

The charging and pumping phases will repeat indefinitely with any leakage flow returning to the inlet of the pump.

Figure 8:
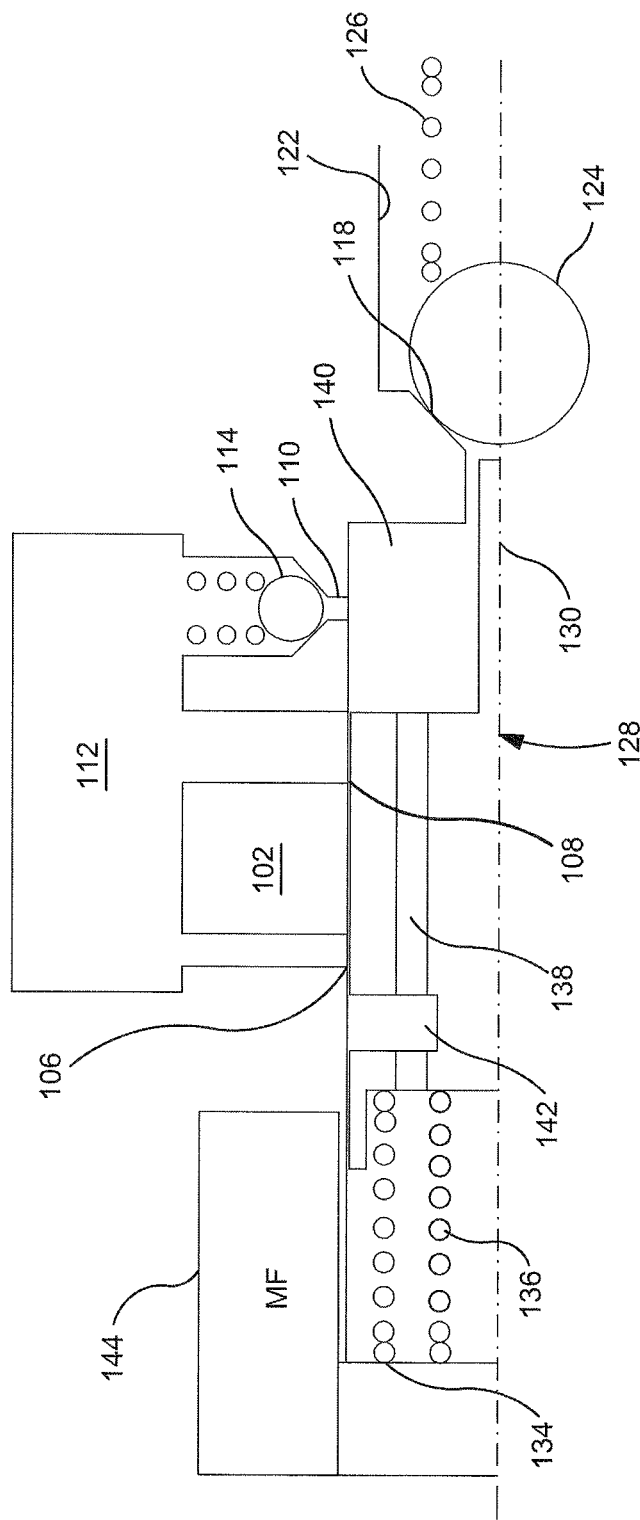

Stage 3 (FIGS. 7 and 8)

During the metering stage, the pump is assumed operable and the fuel transferred to the rail is the fuel metered into the pumping chamber (assuming no losses during pumping).

The combination of spring forces and solenoid actuation displaces the spool valve 128 to a third position in which the front end 130 of the spool valve does not contact the inlet check valve 124, the outer surface covers the bypass port 106, variably uncovers the metering port 108, and the leakage check valve 114 is closed during the charging phase and pumping phase.

During the charging phase, the current is variable, with the lowest current (value 3 MIN in FIG. 3) being higher than during Stage 2, up to maximum current available. Solenoid 144 is partially to fully energized. Spool valve 128 is moved covering port 106 and proportionally opening 108. Because the front 130 of spool valve 128 no longer contacts inlet check valve 124 the inlet check valve is freely operational. Also, because port 108 is only partially open, and because the charging time is limited by the speed of the pump, the volume of fuel entering the pumping chamber through inlet passage 122 is limited by the throttling effect of the inlet check valve 124. The position of spool valve 128 is the product of the force balance of MF with spring 134+spring 136. The exposed opening of 108 (the valve throttling) is proportional to the position of spool valve 128.

During the pumping phase, the plunger will compress the fluid column (a partial or complete column) in the pumping chamber. Once the pressure on the pumping chamber reaches equilibrium with the throttled flow (the inlet metered flow) and the forces of spring 126, valve member 124 will close. The pumping pressure will increase until the outlet check valve 32 (FIG. 1) opens and the pumped volume is transferred to the rail.

Force Balancing

It can thus be appreciated that the combination of forces applied by the springs and the solenoid selectively position the spool valve to uncover and cover the bypass port 106 and the metering port 108 and open or close the inlet check valve member 124 against the inlet valve seat.

Spring 136 is always active, because it must maintain a bias on spring 126 during bypass Stage 1, when the magnetic force MF is zero. Because the free length of metering spring 134 is shorter than that of bypass spring 136, spring 134 is inactive during the bypass stage but it becomes active when the spool valve is in the zero-fueling and metering stages. In Stages 2 and 3, the magnetic force will be in balance with spring 134+spring 126+spring 136. Spring 134 has a higher spring rate than spring 136 and will compress much less than spring 136 in the zero-fueling stage. Spring 134 becomes the main balance with MF during the metering stage.

More particularly, during the bypass condition (Stage 1), spring 136 biases spring 126 to keep check valve member 124 open. In this condition, spring 136 has more force that spring 126. Spring 134 is not in contact with the wall at the back end 132 of spool valve 128, so it is not providing any axial force.

At the zero flow condition of Stage 2, the axially directed magnetic force MF provided by the solenoid 144, acts against the net force of (136+126) and pulls the spool valve 128 (to the left from FIG. 4 to FIG. 5) thereby closing passages 106 and 108 and space S. An important consideration is the amount of air-gap between the magnetic armature at the back 132 of the spool valve and the pole of the solenoid 144. A large air gap produces little MF (as represented by minimal overlap of 144 and 132 for Stage 1, FIG. 4), and that is why spring 136 can have a lower spring rate than spring 134 to push inlet check valve 124 off seat 118 per FIGS. 5 and 6. However, the low spring rate on spring 136 makes the position more susceptible to changes in frictional forces and increases the uncertainty that spool valve 128 will be at the expected zero-flow position for a predefined solenoid current (per FIG. 3). The solution is adding the stronger spring 134 such that the MF compresses spring 136 until the back wall of spool valve 128 closes the space S and contacts spring 134.

Although control of the current for producing the MF corresponding to the zero-flow condition of Stage 2 causes the spool valve 128 to contact metering spring 134, its higher spring rate resists further displacement of the spool valve, assuring proper positioning of the spool valve for zero flow. In effect, during Stage 2 metering spring 134 becomes a semi-positive (temporary) stop for spool valve 128 (until Stage 3 is initiated). So, variation of frictional forces will move spring 134 very little and improve the expected location of spool valve 128.

During the metering condition of Stage 3, the air-gap is further reduced and MF is much more effective. The magnetic force will be in balance with spring 134+spring 126+spring 136. Both springs 136 and 134 compress, but the bulk of the proportional reacting force comes from metering spring 134. Thus, during the metering stage, continual control of the solenoid current changes the magnetic force MF applied to the spool valve 128 and produces proportional displacement of the spool valve against the bias of the metering spring 134 to variably open the metering port 108 to the internal passage 138 of the spool valve.

It should be further appreciated that with the presently disclosed energize-to-close control valve, the Stage 1 bypass condition in which the solenoid fails, opens the inlet check valve 124. In any other bypass condition, a fixed command from the ECU, by maintains check valve 124 This configuration also makes attaining zero fuel Stage 2 independent of the match clearances of spool valve 128 within the bore of sleeve 102 and increased leakage from normal 128/102 wear.

The invention claimed is:

1. A proportional inlet control valve for fluid connection to a high pressure fuel supply pump including an inlet plenum (112) for receiving feed fuel at a feed pressure, an inlet passage (122) for delivering feed fuel to a pumping chamber where a pumping plunger reciprocates between a pumping phase and a charging phase, and an outlet passage from the pumping chamber to a discharge valve, comprising:
   a cylindrical valve sleeve (102) defining a valve axis (104) and having a bypass port (106) at a back end of the sleeve, axially spaced from an intermediate metering port (108), which is axially spaced from a drain port (110) at a front end of the sleeve, with all said ports subject to feed fuel in the inlet plenum, and with said drain port subject to opening and closing of a leakage check valve (114) biased closed with spring force (SI);
   an inlet valve seat (118) situated at the front end of the sleeve and defining a flow opening (120) into the inlet passage to the pumping chamber;
   an inlet check valve member (124) with associated spring (126) adapted to urge the check valve member against the seat with biasing force (SI);
   a spool valve (128) situated for axial displacement within the sleeve, having a front end (130) confronting the inlet check valve member and back end (132) subject to biasing forces of a metering spring (134) and a bypass spring (136), axially toward the inlet check valve member;
   said spool valve including an axially extending internal passage (138) fluidly connected to a fluid volume (140) at the front end of the spool valve, and a control port (142) at the back end of the spool valve, selectively alignable to fluidly connect the bypass port with the internal passage and fluid volume and selectively alignable to fluidly connect the metering port with the internal passage and fluid volume, while the fluid volume always remains in fluid communication with drain port and inlet valve seat such that fluid flowing through the opening of the inlet valve seat also flows through said fluid volume;
   a proportional solenoid actuator (144) magnetically coupled to the back end of the spool valve, for selective variable displacement of the spool valve, whereby combinations of forces applied by said springs and the solenoid selectively position the spool valve to uncover and cover the bypass port and the metering port and open or close the inlet check valve member against the inlet valve seat.

2. The control valve of claim 1, wherein selective variable displacement of the spool valve positions the spool valve into any one of three stages, consisting of
   (i) a pump bypass stage to provide low-pressure flow from the low-pressure supply pump to the common rail;

(ii) a zero net pump flow stage to provide zero flow to the common rail, and (iii) a metering stage to provide a metered amount of flow at high pressure to the common rail.

3. A proportional inlet control valve for fluid connection to a high pressure fuel supply pump including an inlet plenum (112) for receiving feed fuel at a feed pressure, an inlet passage (122) for delivering feed fuel to a pumping chamber where a pumping plunger reciprocates between a pumping phase and a charging phase, and an outlet passage from the pumping chamber to a discharge valve, comprising:

a cylindrical valve sleeve (102) defining a valve axis (104) and having a bypass port (106) at a back end of the sleeve, axially spaced from an intermediate metering port (108), which is axially spaced from a drain port (110) at a front end of the sleeve, with all said ports subject to feed fuel in the inlet plenum, and with said drain port subject to opening and closing of a leakage check valve (114) biased closed (116) with spring force (SI);

an inlet valve seat (118) situated at the front end of the sleeve and defining a flow opening (120) into the inlet passage to the pumping chamber;

an inlet check valve member (124) with associated spring (126) adapted to urge the check valve member against the seat with biasing force (SI);

a spool valve (128) situated for axial displacement within the sleeve, having a front end (130) confronting the inlet check valve member and back end (132) subject to additive biasing forces of a metering spring (134) and a bypass spring (136), axially toward the inlet check valve member;

said spool valve including an outer surface, an axially extending internal passage (138) fluidly connected to a fluid volume (140) at the front end of the spool valve, and a control port (142) through the outer surface at the back end of the spool valve, selectively alignable to fluidly connect the bypass port with the internal passage and fluid volume and selectively alignable to fluidly connect the metering port with the passage and fluid volume, while the fluid volume always remains in fluid communication with drain port and inlet valve seat such that fluid flowing through the opening of the inlet valve seat also flows through said fluid volume;

a proportional solenoid actuator (144) magnetically coupled to the back end of the spool valve, for selective variable displacement of the spool valve into any one of three stages, consisting of a bypass stage wherein the combination of spring forces and solenoid actuation displaces the spool valve to a first position in which the control port aligns with the bypass port, the spool valve outer surface covers the metering port, the inlet check valve is open, and the leakage check valve is closed;

a zero fueling stage, wherein the combination of spring forces and solenoid actuation displaces the spool valve to a second position in which the spool valve outer surface covers the bypass port and the metering port, the inlet check valve is cracked open, and the leakage check valve is closed during the charging phase and open during the pumping phase; and a metering stage, wherein the combination of spring forces and solenoid proportional energization displaces the spool valve to a variable third position in which the spool valve does not contact the inlet check valve, the outer surface covers the bypass port, variably uncovers the metering port, and the leakage check valve is closed during the charging phase and pumping phases.

4. The control valve of claim 3, wherein the bypass spring (136) has a longer free length and a lower spring constant than the free length and spring constant of the metering spring (134).

5. The control valve of claim 3, wherein the bypass spring (136) continuously acts on the spool valve (128) whereas the metering spring (134) acts on the spool valve (128) only during the zero-fueling and metering stages.

6. The control valve of claim 5, wherein in the zero-fueling and metering stages, the magnetic force is in balance with the combined biasing forces of the metering spring (134), inlet check valve spring (126) and bypass spring (136).

7. The control valve of claim 5, wherein the spring rate of the bypass spring (136) is greater than the spring rate of the inlet check valve spring (126) such that in the first stage with a de-energized solenoid the force of the bypass spring (136) acts on the spool valve (128) to open the inlet check valve member (124) against the lower force applied by the inlet check valve spring (126) against the inlet check valve member.

8. The control valve of claim 5, wherein the bypass spring (136) has a longer free length and a lower spring constant than the free length and spring constant of the metering spring (134), such that in the bypass stage the metering spring is axially spaced from the spool valve (128);

in the zero fueling stage the magnetic force compresses the bypass spring (136) through said space to a limit defined by contact of the spool valve (128) with the metering spring (134) to establish the second position of the spool valve (128); and upon said contact, the higher spring constant of the metering spring (134) restrains the spool valve (128) from movement off said second position.

9. The control valve of claim 5, wherein during the metering stage, continual control of the solenoid current changes the magnetic force applied to the spool valve (128) and produces proportional displacement of the spool valve (128) against the bias of the metering spring (134) to variably open the metering port (108) to the internal passage (138) of the spool valve.

10. The control valve of claim 7, wherein the bypass spring (136) has a longer free length and a lower spring constant than the free length and spring constant of the metering spring (134), such that in the bypass stage the metering spring is axially spaced from the spool valve (128);

in the zero fueling stage the magnetic force compresses the bypass spring (136) through said space to a limit defined by contact of the spool valve (128) with the metering spring (134) to establish the second position of the spool valve (128); and upon said contact, the higher spring constant of the metering spring (134) restrains the spool valve (128) from movement off said second position.

11. The control valve of claim 10, wherein during the metering stage, continual control of the solenoid current changes the magnetic force applied to the spool valve (128) and produces proportional displacement of the spool valve (128) against the bias of the metering spring (134) to variably open the metering port (108) to the internal passage (138) of the spool valve.

12. The control valve of claim 3, wherein a leakage check valve (114) and associated leakage valve spring (116) biases the drain port (110) closed with a spring force equal to the spring force applied by the inlet check valve spring (126) against the inlet check valve member (124).

13. The control valve of claim 7, wherein a leakage check valve (114) and associated leakage valve spring (116) bias the drain port (110) closed with a spring force equal to the spring force applied by the inlet check valve spring (126) against the inlet check valve member (124).

14. A proportional inlet control valve for a high pressure fuel supply pump, comprising:
   a cylindrical valve sleeve (102) defining a valve axis (104) and having a bypass port (106) at a back end of the sleeve, axially spaced from an intermediate metering port (108), which is axially spaced from a drain port (110) at a front end of the sleeve;
   an inlet valve seat (118) situated at the front end of the sleeve and defining an opening (120) to a delivery passage;
   an inlet check valve member (124) with associated spring (126) that biases the check valve member against the inlet valve seat;
   a spool valve (128) situated for axial displacement within the sleeve, having a front end (130) confronting the inlet check valve member and a back end (132), said spool valve including an axially extending internal passage (138) fluidly connected to a fluid volume (140) at the front end of the spool valve, and a control port (142) at the back end of the spool valve, selectively alignable to fluidly connect the bypass port with the internal passage and fluid volume and selectively alignable to fluidly connect the metering port with the internal passage and fluid volume, while the fluid volume always remains in fluid communication with drain port and inlet valve seat;
   a bypass spring (136) and a metering spring (134) situated at the back end (132) of the spool valve for biasing the spool valve axially toward the inlet check valve member, wherein the bypass spring (136) has a longer free length and a lower spring rate than the free length and spring rate of the metering spring (134);
   a proportional solenoid actuator (144) magnetically coupled to the back end of the spool valve, for selective variable displacement of the spool valve, whereby combinations of forces applied by said solenoid and said bypass, metering, and inlet check valve springs selectively position the spool valve to uncover and cover the bypass port and the metering port and open or close the inlet check valve member against the inlet valve seat.

15. The control valve of claim 14, wherein the spring rate of the bypass spring (136) is greater than the spring rate of the inlet check valve spring (126) such that with a denergized solenoid the force of the bypass spring (136) acts on the spool valve (128) to open the inlet check valve member (124) against the lower force applied by the inlet check valve spring (126) against the inlet check valve member.

16. The control valve of claim 15, wherein a leakage check valve (114) and associated leakage valve spring (116) biases the drain port (110) closed with a spring force equal to the spring force applied by the inlet check valve spring (126) against the inlet check valve member (124).

* * * * *